Patented Feb. 27, 1940

2,191,486

UNITED STATES PATENT OFFICE 2,191,486

PREVENTION OF SLUDGE FORMATION

Sebastian Karrer, Washington, D. C., and Oscar W. Lusby, Baltimore, Md., assignors, by mesne assignments, to Tennessee Eastman Corporation, Kingsport, Tenn., a corporation of Virginia No Drawing. Application July 28, 1937, Serial No. 156,230

12 Claims. (Cl. 183—114.6)

This invention relates to a process for eliminating or greatly reducing the formation of sludge in the reactivation of oils used for scrubbing gases.

It is now standard practice in many plants manufacturing combustible gases to scrub the gas with large quantities of oil to remove undesirable constituents and recover valuable light oils. In the known processes for the reactivation of such scrubbing oil and the recovery by distillation or otherwise of the light oils from the scrubbing oil, the formation of sludge has presented a serious difficulty. Not only does the sludge so formed necessitate the use of additional equipment, as sludge settling tanks and filters, but the sludge hinders or prevents efficient operation of parts of the system, such as the coolers and heat interchangers because of stopping up the conduits, passages, etc., thereof. Furthermore large quantities of the scrubbing oil are lost with the sludge even under the best known methods of separating the scrubbing oil from the sludge.

This sludge is produced principally through the polymerization of unsaturated compounds, such as styrene and indene, which are scrubbed from the gas by the oil. These compounds polymerize rapidly at atmospheric temperature, and such polymerization is greatly accelerated by the elevated temperatures to which the oil is subjected in conventional steam stills or oil-fired stills. This polymerization of unsaturated compounds in the formation of the sludge also involves a substantial loss of valuable products which could otherwise be recovered and used. Hence the prevention or reduction of sludge formation not only facilitates a more efficient operation of the oil scrubbing and reactivation processes but adds substantially to the economic value thereof.

It is thus an object of the present invention to provide a process for eliminating or greatly reducing the formation of sludge in the reactivation of oils used for scrubbing gases.

Another object of this invention is to provide a process of the type characterized whereby valuable by-products heretofore lost may be recovered.

Another object of this invention is to provide a process of the type characterized which reduces the loss of scrubbing oil in the separation of the light oils therefrom.

Another object of this invention is to provide a process of the type characterized whereby the scrubbing and reactivation processes may be performed more efficiently, and with economies in the running of the plant, as by largely eliminating the difficulties heretofore experienced from the clogging of oil coolers, heat interchangers and the like, as well as by effecting economies in diminishing the losses of scrubbing oils and by-products recoverable therefrom.

Other objects will appear as the description of the invention proceeds.

We have discovered that the addition of small quantities of hardwood distillates or other sludge-preventing substances to the scrubbing oil prevents or greatly reduces this sludge formation, and that the distillate or distillates from hardwood tar boiling between 200° C. and 300° C. is especially effective for this purpose.

For example, a thousand cubic centimeter sample of scrubbing oil when used in a standard scrubbing and reactivating cycle for eight complete cycles, that is it absorbed 10% of light oil from the gas eight times, followed by a reactivation after each cycle by heating and steaming, produced approximately twenty-five grams of sludge. A similar sample tested in exactly the same manner and at the same time but containing 0.5% hardwood distillate boiling between 200° C. and 300° C. produced only one-tenth as much sludge, i. e., 2.5 grams of sludge. Even this formation of sludge was found to be materially reduced if a small percentage of hardwood distillate as referred to was added at each cycle, as shown by the fact that a third sample of scrubbing oil tested in a similar manner but with approximately 0.062% hardwood distillate boiling between 200° C. and 300° C. added each time the oil absorbed light oil produced only 1.6 grams of sludge during the test.

The foregoing results have also been demonstrated in preventing sludge formation on a commercial scale by use in a large plant manufacturing combustible gas and scrubbing with approximately 500 gallons of oil per million cubic feet of gas. In this plant the oil was reactivated by heating in a direct-fired still. After three months operation without use of hardwood distillates in the oil the sludge contained in the oil was about 27 grams per thousand cubic centimeters and a large amount had settled in the storage tank. The quantity of sludge present was sufficient to prevent completely the operation of the oil cooler, and it frequently stopped up the lines, while the quantity of valuable light oils lost through its sludge formation was very large. Three gallons of hardwood distillate boiling between 200° C. and 300° C. were added to each 500 gallons of scrubbing oil, producing a 0.6% solution by volume, the hardwood distillate being added gradually to the oil pumped to the scrubber. Ten days after starting the addition of the hardwood distillate and four days after the total quantity had been added the sludge in the oil had decreased to 12.2 grams per thousand cubic centimeters, the oil cooler was operating with little attention and no trouble was being experienced from stoppages of the lines. Five days later the total sludge in the oil had decreased to 5.2 grams per thousand cubic centimeters.

The effectiveness of the hardwood distillate in removing sludge or preventing its formation in the scrubbing oil was also shown in the plant test by viscosity measurements. At the start of plant operations the fresh scrubbing oil had a viscosity of 99 sec. Saybolt Universal at 50° F. and when the hardwood distillate was first added the viscosity had increased to more than 1200 sec. Saybolt Universal at 50° F. on account of sludge formation. Ten days after the addition of the hardwood distillate the viscosity had decreased to 213 sec. Saybolt Universal at 50° F.

The hardwood distillate boiling between 200° C. and 300° C. is miscible with the light oils in all proportions, and soluble in scrubbing oil to the extent of 5% to 6% by volume. Its solubility in water is negligible, and thus it is not removed from the oil by any water which may be condensed during the scrubbing operation.

The hardwood distillate, which is an oily liquid, may be added either in relatively large quantities, say 0.5% to 0.6% by volume at a time, or it may be added gradually in small quantities, say 0.05% to 0.06% by volume at a time, the latter being preferable. Thus during the plant test above referred to the hardwood distillate was added by a small chemical proportioning pump with adjustable delivery rate.

However, we do not limit ourselves to the quantities of hardwood distillate specified or to any specific method of adding it because the quantities required to effectively reduce or prevent sludge formation will vary somewhat with the operating conditions, as with the nature and amount of light oils absorbed from the gas during the scrubbing operation, etc., so that the optimum quantity for specific conditions should be determined in each instance. There are many available methods for adding the hardwood distillate to the scrubbing oil either gradually in small quantities or continuously or in batches of larger quantities. It is advantageous to add the hardwood distillate to the oil before it reaches the scrubber, but within the broader aspects of this invention such is not essential as the hardwood distillate is effective if added at any point in the oil circulating system.

It will therefore be perceived that by the present invention a process has been provided whereby the formation of sludge is greatly reduced or largely eliminated with the result that a more efficient operation of the oil scrubbing and recovery processes is had, while important economies are effected in that there are smaller losses of the scrubbing oil, larger yield of the light oils as valuable by-products, less interference with plant operation, etc.

While the preferred procedure has been described in considerable detail it is to be expressly understood that the invention is not restricted thereto. As pointed out, the quantity of hardwood distillate to be used, the location of the point in the oil circulating system at which it is to be introduced, the manner in which it is introduced, etc., may be varied depending upon the operating conditions, the quantity and character of the light oils to be removed, etc., and while it is preferred to use a hardwood distillate derived from hardwood tar, some of the advantages of the present invention may be obtained by use of other distillates, and in its broad aspects other sludge-preventing substances may be used by suitable introduction into the oil. Various changes may therefore be made in the procedure of the present invention, as will now be apparent to those skilled in the art, depending not only upon conditions in the plant to which the invention is applied but also the extent to which the advantages of the present invention are to be attained. Therefore, reference is to be had to the appended claims for a definition of the limits of the invention.

What is claimed is:

1. A process of preventing or greatly reducing sludge formation in a scrubbing medium that is reactivated by distillation which includes the step of adding to the scrubbing medium a distillate derived from hardwood tar.

2. A process of preventing or greatly reducing sludge formation in a scrubbing medium that is reactivated by distillation which includes the step of adding to the scrubbing medium a hardwood distillate boiling between 200° C. and 300° C.

3. A process of preventing or greatly reducing sludge formation in a scrubbing oil used for scrubbing gases and reactivated by distillation, said process comprising the addition to the scrubbing oil of a distillate derived from hardwood tar.

4. A process of preventing or greatly reducing sludge formation in a scrubbing oil used for scrubbing gases and reactivated by distillation, said process comprising the addition of a hardwood distillate boiling between 200° C. and 300° C. to the scrubbing oil in amounts approximating 0.05 per cent of the total quantity of the said oil, the hardwood distillate being added prior to reactivation.

5. In the manufacture of combustible gases, the process which includes the step of preventing or greatly reducing sludge formation in the scrubbing medium which is used for scrubbing gases and reactivated by distillation by adding a distillate derived from hardwood tar to the scrubbing medium prior to reactivation.

6. In the manufacture of combustible gases, the process which includes the step of preventing or greatly reducing sludge formation in the scrubbing medium which is used for scrubbing gases and reactivated by distillation by adding to the scrubbing medium a hardwood distillate boiling between 200° C. and 300° C. prior to reactivation.

7. In the manufacture of combustible gases, the process which includes the step of preventing or greatly reducing sludge formation in the scrubbing medium which is used for scrubbing gases and reactivated by distillation by gradually adding to the scrubbing medium relatively small quantities of a distillate derived from hardwood tar.

8. In the manufacture of combustible gases, the process which includes the step of preventing or greatly reducing sludge formation in the scrubbing medium which is used for scrubbing gases and reactivated by distillation by gradually adding to the scrubbing medium relatively small quantities of a hardwood distillate boiling between 200° C. and 300° C.

9. In the manufacture of combustible gases, the process which includes the step of preventing or greatly reducing sludge formation in the scrubbing medium which is used for scrubbing gases and reactivated by distillation by progressively adding to the scrubbing medium a distillate derived from hardwood tar in amounts of approximately 0.05% of the total quantity of said medium.

10. In the manufacture of combustible gases, the process which includes the step of preventing or greatly reducing sludge formation in the scrubbing medium which is used for scrubbing gases and reactivated by distillation by progressively adding to the scrubbing medium a hardwood distillate boiling between 200° C. and 300° C. in amounts of approximately 0.05% of the total quantity of said medium.

11. In the manufacture of combustible gases, the process which includes the step of preventing or greatly reducing sludge formation in the scrubbing medium which is used for scrubbing gases and reactivated by distillation by adding a distillate derived from hardwood tar to the scrubbing medium before it reaches the scrubber.

12. In the manufacture of combustible gases, the process which includes the step of preventing or greatly reducing sludge formation in the scrubbing medium which is used for scrubbing gases and reactivated by distillation by adding to the scrubbing medium before it reaches the scrubber a hardwood distillate boiling between 200° C. and 300° C.

SEBASTIAN KARRER.
OSCAR W. LUSBY.